Figure 1:
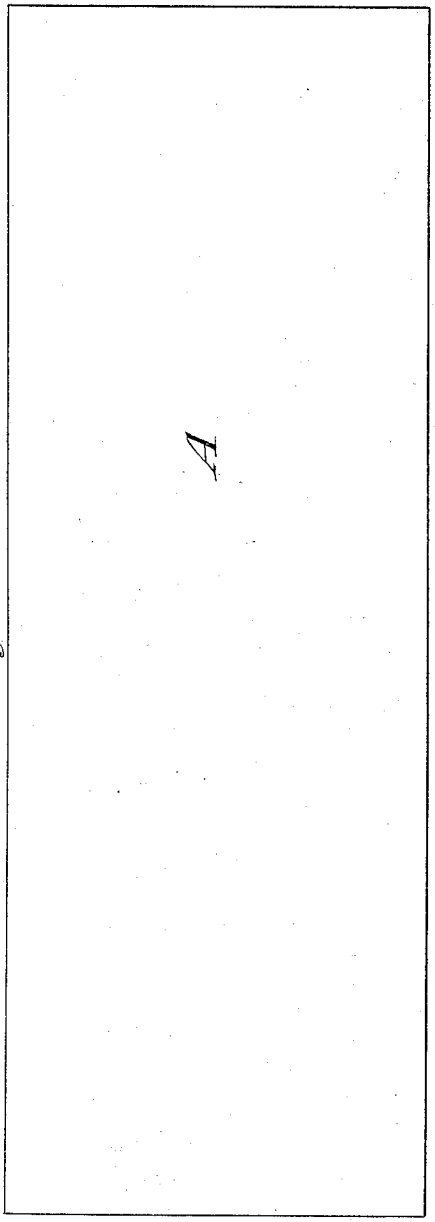

(No Model.)

F. C. PLUME.
METHOD OF MAKING DANDY ROLLS FOR PAPER MAKING.

No. 319,615.  Patented June 9, 1885.

Witnesses:
Matthew Pollock
Minert Lindeman

Inventor:
Frank C. Plume
by his Attys
Brown & Hall

UNITED STATES PATENT OFFICE.

FRANK C. PLUME, OF THOMASTON, CONNECTICUT.

METHOD OF MAKING DANDY-ROLLS FOR PAPER-MAKING.

SPECIFICATION forming part of Letters Patent No. 319,615, dated June 9, 1885.

Application filed April 30, 1885. (No model.)

*To all whom it may concern:*

Be it known that I, FRANK C. PLUME, of Thomaston, in the county of Litchfield and State of Connecticut, have invented a new and useful Improvement in the Method of Making Dandy-Rolls for Paper-Making Machines, of which the following is a specification.

The dandy-rolls most commonly heretofore used in paper-making machines are faulty, in that they are expensive to make and will not retain a perfectly cylindric form. These rolls are covered with wire-cloth, and the backing for this wire-cloth covering has been made in various ways—as, for instance, a series of parallel metallic rods have been secured to the two end pieces of the roll, and supported at intervals in their length by rings made of heavy wire, which are placed at suitable distances apart throughout the length of the roll, the rods being brazed to the rings and to the end pieces of the roll, and a covering of wire-cloth laid over the rods.

In Letters Patent No. 301,732, granted July 8, 1884, to David Lockwood, is described a method of making a backing for a dandy-roll, which consists in taking a finely-perforated sheet of metal of the necessary size, then bending it into cylindric form, with the ends of the perforated sheet slightly lapped, and brazing the ends or edges together. Such a perforated metal backing for the wire-cloth covering is very desirable; but it is very difficult to braze together the two edges of the perforated sheet, which is bent into cylindric form, and which are irregular by reason of the perforations in the sheet, and no means have yet been devised for successfully accomplishing this result.

The object of my invention is to provide for more readily making a roll with a perforated metal backing for the wire-cloth covering; and to this end my invention consists in an improvement in the method of making a perforated metal backing for the wire covering of a dandy-roll, said method consisting in first cutting out or otherwise producing a sheet of metal of required size having opposite edge portions which are imperforate, in then bending the sheet of metal into cylindric form and brazing or soldering the longitudinal joint formed by the meeting edges of the sheet, and in afterward perforating the cylindric shell or backing formed by such sheet throughout its extent. According to this method of construction the cylindric backing will have a longitudinal seam or joint; but such seam or joint is formed and completed while the edge portions of the sheet of metal have a continuous and unbroken surface, and before the sheet is perforated at such edge portions, and hence the formation of such longitudinal seam or joint will be no more difficult than is the making of a metal tube having a longitudinal joint.

Figure 2:
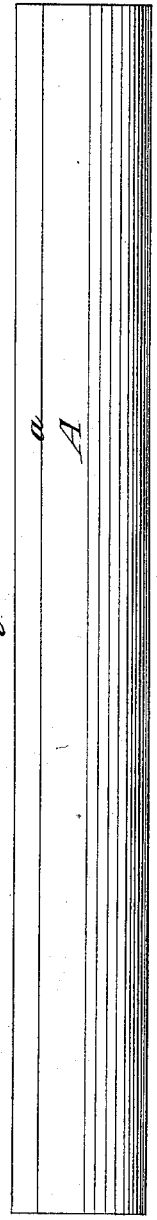
Figure 3:
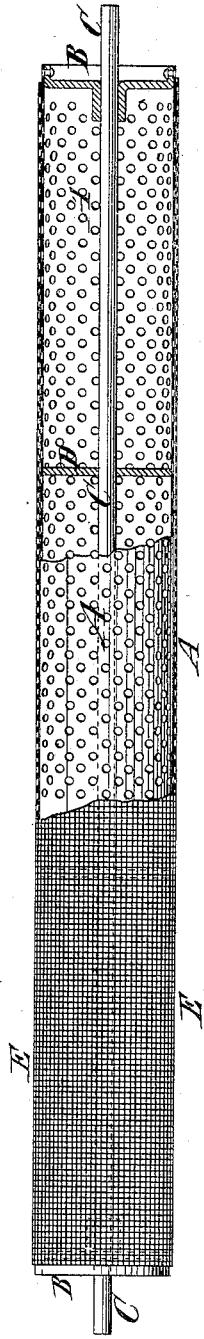

In the accompanying drawings, Figure 1 represents a sheet of metal which is to form the backing for a dandy-roll. Fig. 2 represents such backing rolled into cylindric form and having its edges joined by a longitudinal seam or joint; and Fig. 3 represents a roll embodying my invention, a portion of the length being shown in exterior view and the other portion of the length of the roll being shown in longitudinal section.

Similar letters of reference designate corresponding parts in all the figures.

In carrying out my invention the roll preferably consists of a sheet-metal backing, A, the ends of which are slipped upon and secured by riveting, soldering, or otherwise to the flanged heads B at the ends of the roll, and in said heads is fitted a shaft, C, comprising the journals for the roll. The roll may also have at intervals in its length supporting disks or flanges D, which preserve the cylindric form of the metal backing A, and the completed roll is covered with fine wire-cloth, E, as represented in Fig. 3.

My invention relates only to the method of making the perforated metal backing A for the wire cloth E. To make this backing, I take a sheet of metal of proper size, as shown in Fig. 1, and having an imperforate or continuous surface, or at least having its opposite end portions imperforate and continuous. I bend this sheet into cylindric form while still imperforate, as shown in Fig. 2, and I join the meeting edges of the bent sheet by a longitudinal seam or joint, *a*, which is formed by brazing or soldering the edges of the sheet together. This sheet of imperforate metal A may have its meeting edges or ends either lapped or butted together and soldered or brazed to form the joint $a$. This may be readily done while the sheet throughout its extent, or at least at the edge portions thereof, is in an imperforate condition. After the edges of the sheet have been soldered or brazed together so as to form a longitudinal seam or joint, $a$, the entire cylindric shell or body thus formed is finely perforated throughout its extent, as represented in Fig. 3, and this perforating may be done either by drilling holes in the cylindric shell or by punching. After the cylindric shell or backing A has been finely perforated throughout its extent, either by drilling or punching, its ends are brazed or riveted upon the heads B, which may be of cast metal, and if the roll is of great length I preferably provide disks or supports D intermediate between the heads B B, as shown in Fig. 3. The covering E, of fine wire-cloth, is then applied to the outside of the perforated metal backing, to prepare the roll for use.

I do not claim, broadly, as of my invention a roll having a perforated metal backing for the wire-cloth covering, as such a roll is shown and described in patent to Lockwood, above referred to; but I desire to limit my invention to the method of making this backing, which involves the bending of a sheet of metal into cylindric form and the soldering or brazing of its edges together while such edge portions are in an imperforate state.

The sheet of metal may be left wholly imperforate throughout its extent until after it is bent into cylindric form and the longitudinal joint $a$ formed, or the portion of the sheet remote from the opposite edges may be perforated while the metal is in the form of a sheet, leaving the opposite edge portions imperforate and continuous until after the sheet is bent into cylindric form and the longitudinal joint $a$ made by soldering or brazing.

I now prefer not to perforate the sheet A until after it is rolled into cylindric form and the longitudinal joint formed by soldering or brazing, because the sheet may be more readily bent or rolled into the form of a true cylinder before it is perforated at any part.

What I claim as my invention, and desire to secure by Letters Patent, is—

The method of making a perforated metal backing for a dandy-roll, consisting in first producing a sheet of metal of the desired size, and having its opposite edge portions imperforate, in then bending the sheet into cylindric form and brazing or soldering the longitudinal joint formed by the meeting edges of the sheet, and in finally perforating or completing the perforation of the cylinder thus produced, substantially as herein described.

FRANK C. PLUME.

Witnesses:
J. S. EASTWOOD,
E. C. STOUGHTON.